United States Patent
She et al.

(10) Patent No.: US 10,121,376 B2
(45) Date of Patent: Nov. 6, 2018

(54) VEHICLE ASSISTANCE

(71) Applicant: Ford Global Technologies, LLC, Dearborn, MI (US)

(72) Inventors: Eric She, Troy, MI (US); Scott J. Lauffer, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 30 days.

(21) Appl. No.: 15/285,542

(22) Filed: Oct. 5, 2016

(65) Prior Publication Data

US 2018/0096602 A1 Apr. 5, 2018

(51) Int. Cl.
| | |
|---|---|
| *G08G 1/017* | (2006.01) |
| *G08G 1/16* | (2006.01) |
| *B60W 10/04* | (2006.01) |
| *B60W 10/18* | (2012.01) |
| *B60W 10/20* | (2006.01) |

(Continued)

(52) U.S. Cl.
CPC ............ G08G 1/162 (2013.01); B60W 10/04 (2013.01); B60W 10/18 (2013.01); B60W 10/20 (2013.01); B60W 30/00 (2013.01); G05D 1/0246 (2013.01); G05D 1/0289 (2013.01); G07C 5/0816 (2013.01); G07C 5/0841 (2013.01); G08G 1/165 (2013.01); G08G 1/166 (2013.01); G08G 1/20 (2013.01); H04W 84/00 (2013.01); B60W 2420/42 (2013.01); B60W 2420/52 (2013.01); B60W 2550/30 (2013.01); B60W 2550/40 (2013.01); B60W 2710/00 (2013.01); G05D 2201/0213 (2013.01)

(58) Field of Classification Search
CPC ............ G08G 1/017; G08G 1/22; G08G 1/20; G08G 1/202; G08G 1/162; G08G 1/09623; G08G 1/09626; G08G 1/0965; G08G 1/0968; B60W 10/04; B60W 10/18; B60W 10/20; B60W 2410/42; B60W 2410/52; B60W 2550/30; B60W 2550/40; B60W 2710/00; G05D 1/0246; G05D 1/0289; G05D 2201/0213; G07C 5/0816; G07C 5/0841

USPC .... 701/25, 23, 31.4, 70, 2, 36, 41, 96, 29.2, 701/93

See application file for complete search history.

(56) References Cited

U.S. PATENT DOCUMENTS 6,128,559 A * 10/2000 Saitou .................... B61L 23/34
                                                    340/436
8,229,618 B2    7/2012 Tolstedt et al.
(Continued)

FOREIGN PATENT DOCUMENTS

| EP | 0991046 A1 | 4/2000 |
|---|---|---|
| JP | 2007025782 A | 2/2007 |
| WO | WO 2015180931 A1 | 12/2015 |

OTHER PUBLICATIONS

Search Report from United Kingdom Intellectual Property Office dated Mar. 19, 2018 regarding Application No. GB1715418.8 (3 pages).

*Primary Examiner* — Richard A Goldman
(74) *Attorney, Agent, or Firm* — Frank A. MacKenzie; Bejin Bienemann PLC

(57) ABSTRACT

A computer is programmed to receive a message from a second vehicle indicating a fault in a second vehicle component. The computer is further programmed to modify an area of control of the first vehicle to include a location of the second vehicle, and to provide a control instruction to the second vehicle.

20 Claims, 6 Drawing Sheets

(51) Int. Cl.
*G05D 1/02* (2006.01)
*G07C 5/08* (2006.01)
*G08G 1/00* (2006.01)
*B60W 30/00* (2006.01)
*H04W 84/00* (2009.01)

(56) References Cited

U.S. PATENT DOCUMENTS

| | | | | |
|---|---|---|---|---|
| 8,483,895 | B1* | 7/2013 | Beregi | B61B 1/00 246/182 C |
| 9,561,778 | B2* | 2/2017 | Atoche | B60R 25/01 |
| 9,599,986 | B1* | 3/2017 | Eberbach | G05D 1/0061 |
| 9,669,842 | B2* | 6/2017 | Matsumoto | B60W 50/045 |
| 2006/0265115 | A1* | 11/2006 | Etori | B60W 30/17 701/96 |
| 2007/0233337 | A1* | 10/2007 | Plishner | G05D 1/0295 701/23 |
| 2009/0192666 | A1* | 7/2009 | Trippler | G08G 1/163 701/31.4 |
| 2010/0030423 | A1* | 2/2010 | Nathanson | G07C 5/008 701/33.4 |
| 2010/0063672 | A1* | 3/2010 | Anderson | G05D 1/0077 701/29.2 |
| 2010/0256852 | A1* | 10/2010 | Mudalige | G08G 1/163 701/24 |
| 2010/0332073 | A1* | 12/2010 | Mathieson | G07C 5/008 701/29.6 |
| 2011/0077815 | A1* | 3/2011 | Walter | B61K 9/00 701/31.4 |
| 2012/0143392 | A1* | 6/2012 | Lurie | B64C 13/04 701/1 |
| 2012/0158239 | A1* | 6/2012 | Brunou | B60T 8/1755 701/29.1 |
| 2012/0166021 | A1* | 6/2012 | Sawyer | B60R 25/04 701/2 |
| 2012/0197501 | A1* | 8/2012 | Sujan | B60K 23/00 701/51 |
| 2012/0277965 | A1* | 11/2012 | Takahashi | B60W 30/143 701/70 |
| 2014/0136414 | A1* | 5/2014 | Abhyanker | G06Q 50/28 705/44 |
| 2014/0172221 | A1* | 6/2014 | Solyom | B62D 15/0285 701/23 |
| 2014/0172265 | A1* | 6/2014 | Funabashi | G08G 1/22 701/96 |
| 2014/0195108 | A1* | 7/2014 | Schumacher | G06F 17/00 701/36 |
| 2014/0343792 | A1* | 11/2014 | Akiyama | B60W 30/0956 701/41 |
| 2015/0178998 | A1 | 6/2015 | Attard et al. | |
| 2015/0243172 | A1* | 8/2015 | Eskilson | A61B 5/18 701/1 |
| 2016/0001781 | A1* | 1/2016 | Fung | G06F 19/345 701/36 |
| 2016/0071418 | A1* | 3/2016 | Oshida | G08G 1/22 701/23 |
| 2017/0072967 | A1 | 3/2017 | Fendt et al. | |
| 2017/0111187 | A1* | 4/2017 | Zanier | H04W 4/046 |
| 2017/0178514 | A1* | 6/2017 | Dry | G08G 1/096716 |
| 2017/0274906 | A1* | 9/2017 | Hassan | B60W 40/08 |
| 2017/0309086 | A1* | 10/2017 | Zhai | A61B 5/0013 |

* cited by examiner

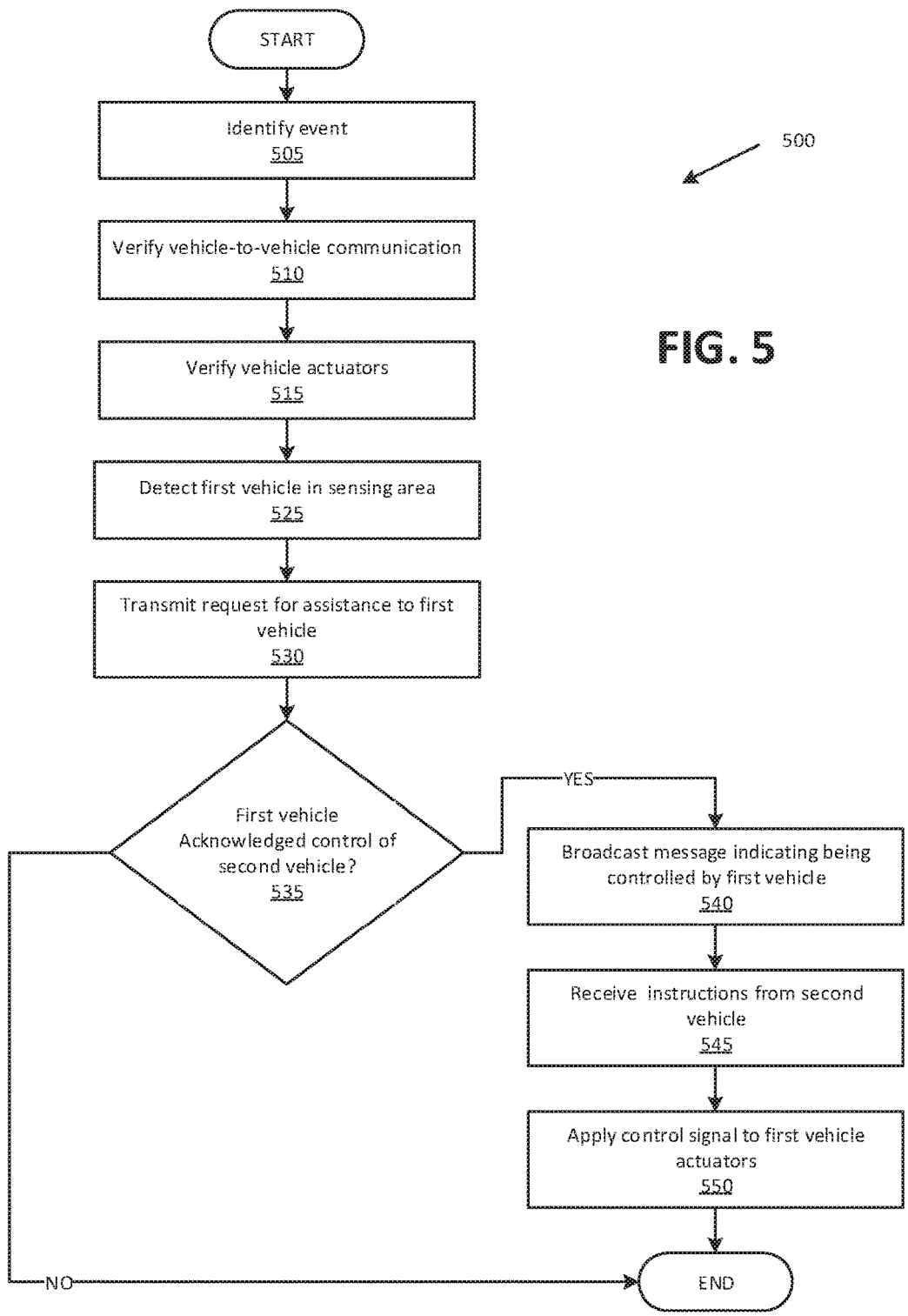

VEHICLE ASSISTANCE

BACKGROUND

In an autonomous vehicle, i.e., a self-driving vehicle, certain vehicle operations rely on vehicle sensors. The vehicle sensors detect road features, other vehicles, pedestrians, etc. A vehicle sensor may fail during operation of the vehicle. A failure in a vehicle sensor may impair one or more of the vehicle operations. For example, a computer, which controls the vehicle steering, may not operate properly upon a failure of a sensor providing data to detect road lane markings. When one or more vehicle operations are impaired, the vehicle may obstruct a flow of road traffic, present heightened collision risk, etc.

BRIEF DESCRIPTION OF THE DRAWINGS

FIG. 5 is a flowchart of an exemplary process for a client vehicle receiving control commands from a host vehicle.

DETAILED DESCRIPTION

Introduction

Figure 1:
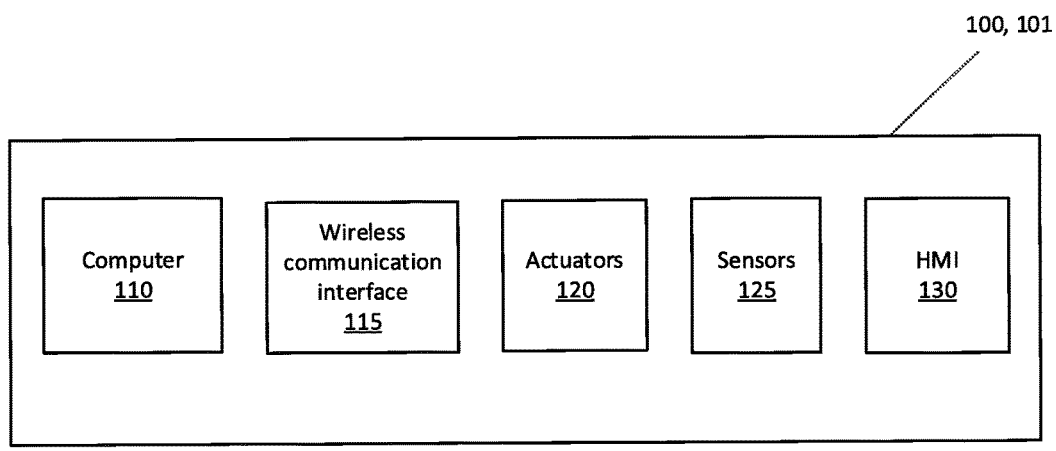
FIG. 1 is a block diagram of an exemplary vehicle system.

With reference to the Figures, wherein like numerals indicate like parts throughout the several views, a computer 110 of a first vehicle 100 is programmed to receive a message from a second vehicle 101 indicating an event, e.g., a fault such as a failure or malfunctioning of one or more sensors 125 in the second vehicle 101. The computer 110 is further programmed to modify an area of control 205a, 205b (see FIGS. 2 and 3A) of the first vehicle 100 to include a location of the second vehicle 101 and provide one or more control instructions to the second vehicle 101.

FIG. 1 is a block diagram of a vehicle 100, 101. For convenience herein, the vehicle 100 may be referred to as a first or host vehicle 100, and the second vehicle 101 may be referred to as a second or client vehicle 101. However, as seen in FIG. 1, a host vehicle 100 and a client vehicle 101 may have common elements, including a computer 110, a wireless communication interface 115, actuators 120, sensors 125, and/or a human machine interface (HMI 130), each of which are discussed in more detail below.

System Elements

The vehicles 100, 101 may be powered in variety of known ways, e.g., with an electric motor and/or internal combustion engine. The vehicles 100, 101 include the computer 110, a wireless communication interface 115, actuators 120, sensors 125, a human machine interface (HMI) 130, and other components discussed herein below.

The computer 110 includes a processor and a memory such as are known. The memory includes one or more forms of computer-readable media, and stores instructions executable by the computer 110 for performing various operations, including as disclosed herein.

The computer 110 may operate the vehicle 100 in an autonomous or semi-autonomous mode. For purposes of this disclosure, an autonomous mode is defined as one in which each of a propulsion (e.g., via a powertrain including an electric motor and/or an internal combustion engine), braking, and steering of the vehicle 100 are controlled by the computer 110; in a semi-autonomous mode the computer 110 controls one or two of propulsion, braking, and steering of the vehicle 100.

The computer 110 may include programming to operate one or more of brakes, propulsion (e.g., control of acceleration in the vehicle by controlling one or more of an internal combustion engine, electric motor, hybrid engine, etc.), steering, climate control, interior and/or exterior lights, etc., of the vehicle 100 as well as to determine whether and when the computer 110, as opposed to a human operator, is to control such operations.

The computer 110 is generally arranged for communications on a vehicle communication network, e.g., including a communication bus such as a controller area network (CAN) or the like. The computer 110 may include or be communicatively coupled to, e.g., via a vehicle communications bus as described further below, more than one processors, e.g., controllers or the like included in the vehicle for monitoring and/or controlling various subsystems such as a powertrain, brake, steering, etc.

Via the vehicle network, the computer 110 may transmit messages to various devices in the vehicle 100, 101 and/or receive messages from the various devices, e.g., controllers, actuators, sensors, etc., including sensors 125. Alternatively or additionally, in cases where the computer 110 actually comprises multiple devices, the vehicle communication network may be used for communications between devices represented as the computer 110 in this disclosure. Further, as mentioned below, various controllers and/or sensors 125 may provide data to the computer 110 via the vehicle communication network. As mentioned above, the computer 110 may identify an event according to information included in a message received via a vehicle 100, 101 communication network from a vehicle 100, 101 component.

In addition, the computer 110 may be configured for communicating through a vehicle-to-vehicle (V-to-V) wireless communication interface 115 with other vehicles 100, e.g., via a vehicle-to-vehicle communication network. The V-to-V communication network represents one or more mechanisms by which the computers 110 of vehicles 100 may communicate with other vehicles 100, 101, 102, and may be one or more of wireless communication mechanisms, including any desired combination of wireless (e.g., cellular, wireless, satellite, microwave and radio frequency) communication mechanisms and any desired network topology (or topologies when multiple communication mechanisms are utilized). Exemplary V-to-V communication networks include cellular, Bluetooth, IEEE 802.11, dedicated short range communications (DSRC), and/or wide area networks (WAN), including the Internet, providing data communication services.

The wireless communication interface 115 may include known electronic circuitry such as a radio frequency (RF) transmitter, a radio frequency receiver, and an amplifier circuit to boost an outgoing and incoming RF signal.

As already mentioned, generally included in instructions stored in the memory and executed by the computer 110 is programming for operating one or more vehicle components, e.g., braking, steering, propulsion, etc., without intervention of a human operator. Using data received in the computer 110, e.g., the sensor data from the sensors 125, etc., the computer 110 may make various determinations and/or control various vehicle components and/or operations without a driver to operate the vehicle. For example, the computer 110 may include programming to regulate vehicle operational behaviors such as speed, acceleration, deceleration, steering, etc., as well as tactical behaviors such as a distance between vehicles and/or amount of time between vehicles, lane-change minimum gap between vehicles, left-turn-across-path minimum, time-to-arrival at a particular location, intersection (without signal) minimum time-to-arrival to cross the intersection, etc.

Sensors 125 may include a variety of devices known to provide data via the vehicle communications bus. For example, the sensors 125 may include one or more cameras, radars, and/or Light Detection and Ranging (LIDAR) sensors disposed in the vehicle 100 providing data encompassing at least some of the vehicle exterior. The data may be received by the computer 110 through a suitable interface such as in known.

The sensors 125 may also include a GPS (global positioning system) device. A GPS sensor 125 may transmit, e.g., via the computer 110 and interface 115, current geographical coordinates, e.g., latitude and longitude as are known, of the vehicle 100.

The computer 110 may be programmed to detect a failure or fault in a various components of the vehicle 100 such as the sensors 125, e.g., a camera sensor 125. For example, an overheated camera may be partially or fully unable to function properly and to detect another vehicle 101 proximate to the vehicle 100. The computer 110 may determine whether a camera is overheated by comparing temperature of the camera, e.g., via a temperature sensor mounted to electronic circuitry of the camera, to a temperature threshold, e.g., 80 degrees Celsius. Additionally or alternatively, the sensors 125 or components of the other vehicle 101 may be programmed to detect internal failures such as a memory corruption as is known. A failed sensor 125 may communicate an internal failure to the computer 110, e.g., by transmitting an error code via the vehicle communication network as is known. The term "fault" as used herein may refer to any failure or malfunction of a vehicle 100, 101 components, e.g., a root-cause fault such as a disconnected sensor cable, a physically broken or otherwise disrupted sensor, etc., or a failure generated by a root-cause such as interrupted communication on a vehicle communication bus. A fault may be report in a message on a vehicle 100, 101 communications bus in a known manner.

The actuators 120 typically include circuits, chips, or other electronic components that can actuate various vehicle subsystems in accordance with appropriate control signals as is known. For instance, the actuators 120 may include one or more relays, servomotors, etc. The actuators 120, therefore, may be used to control braking, acceleration, and steering of the host vehicle 100. The control signals used to control the actuators 120 may be generated by the computer 110, a control unit located in the vehicle 100, e.g., the brake controller, etc., or a second vehicle 101.

The human-machine interface (HMI) 130 can include a touch screen, an interactive voice response (IVR) system, and/or other input/output mechanisms such as are known, and can receive input data from a user and/or outputs data to the user. For example, the HMI 130 in a vehicle 100 may output information indicating an event occurred in another vehicle 100, e.g., a sensor 125 such as a radar of the other vehicle 100 failed.

Sensing Areas and Areas of Control

Figure 2:
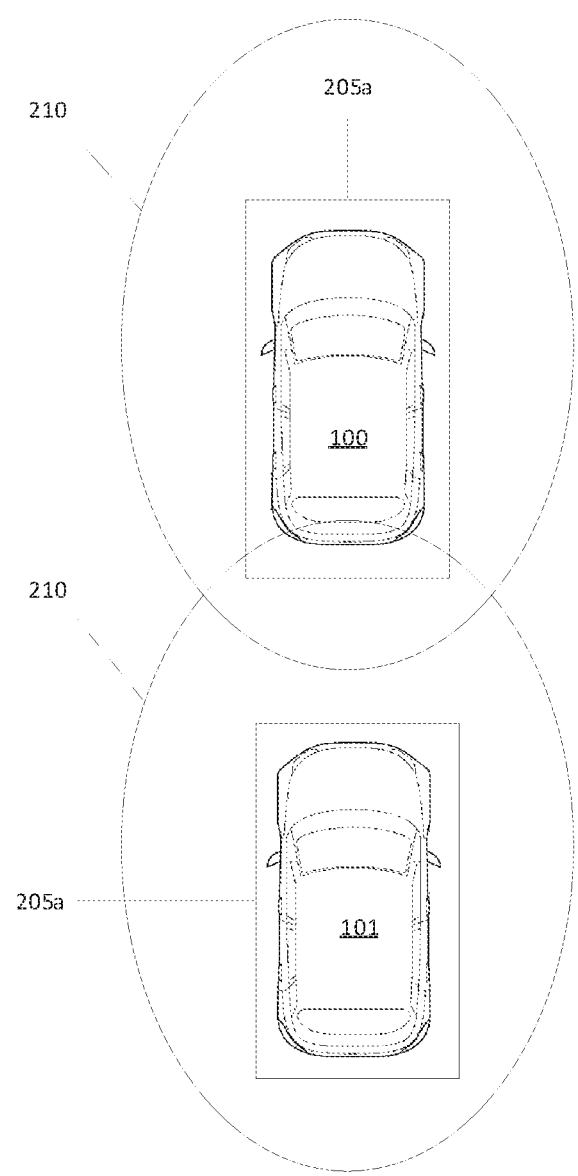
FIG. 2 is a diagram showing vehicles with sensing areas and control areas substantially limited to each vehicle.
Figure 3A:
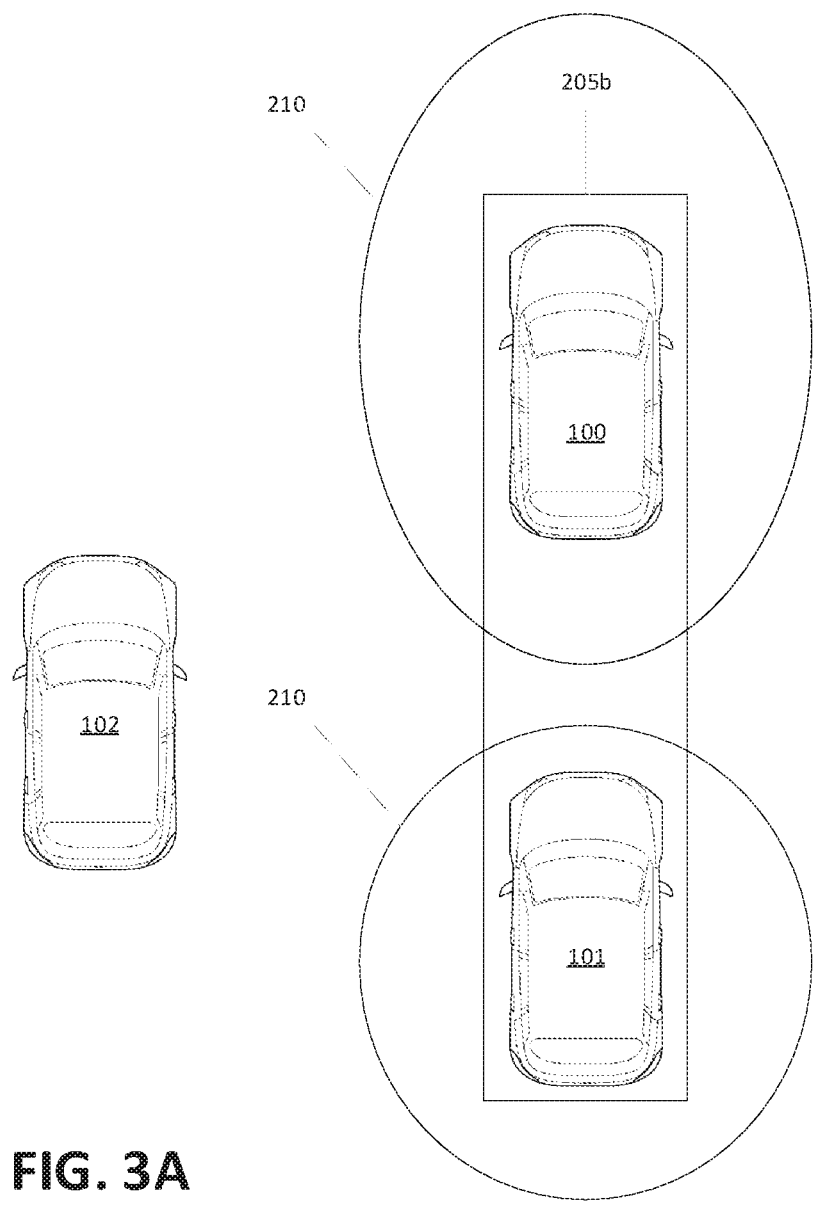
FIG. 3A is a diagram showing vehicles with sensing areas and a control area including multiple vehicles.
Figure 3B:
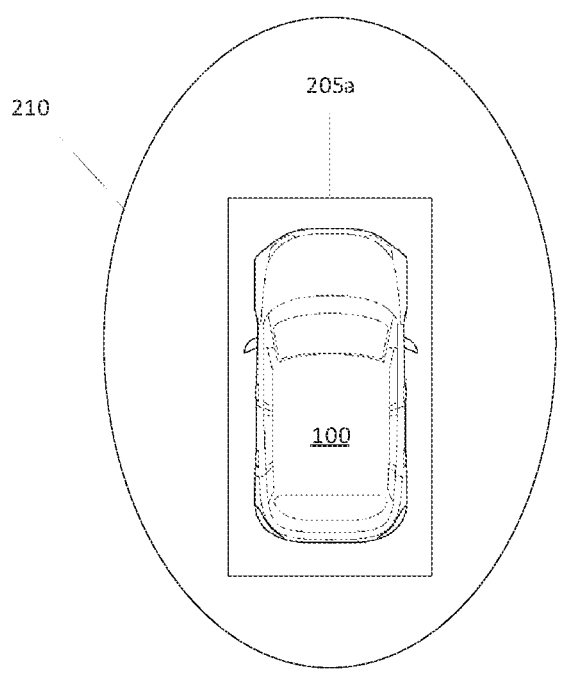
FIG. 3B is a diagram showing a first vehicle with a sensing area and a control area and a second vehicle with sensing and/or control failures.
Figure 3B:
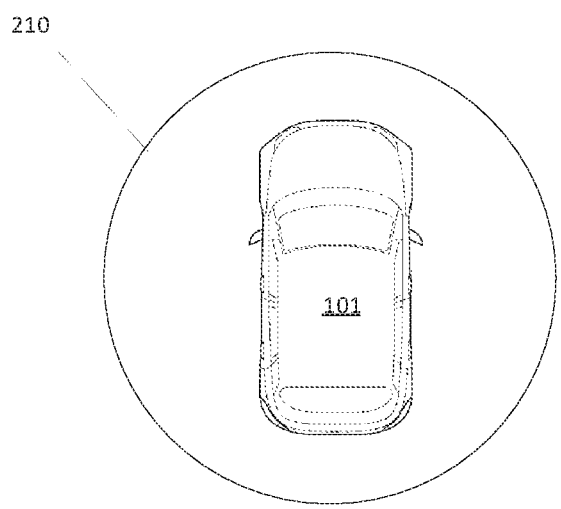

Referring now to FIGS. 2-3 in addition to FIG. 1, the vehicle 100 computer 110 is programmed to receive a message from a second vehicle 101 indicating an event. An "event" is defined herein as a failure or malfunction of a second vehicle 101 component or subsystem, such as a sensor 125. An event can be reported using an error or status message or the like such as is known to be provided on a vehicle 101 communication network or the like. Example events include a malfunction in a camera, radar, etc.

Upon receiving notification of an event in a second vehicle 101, the first vehicle 100 computer 110 is further programmed to modify an area of control 205a, 205b of the first vehicle 100 to include a location of the second vehicle 101, and to provide one or more control instructions, e.g., a brake instruction, to the second vehicle 101. Alternatively or additionally, a computer 110 in the second vehicle 101 can be programmed to detect an event, in a vehicle 101 component, e.g., sensor, and to detect a first vehicle 100 in the sensing area 210 and to transmit a message for receipt by the first vehicle 100 indicating the event. Alternatively, the second vehicle 101 computer 110 can be programmed to broadcast a message, e.g., via vehicle-to-vehicle communication network interface, as is known, to other vehicles 100. The second vehicle 101 computer 110 is further programmed to apply a control signal received from the first vehicle 100 to actuate one or more subsystems or components of the second vehicle 101.

A vehicle 100, 101 "area of control" 205a, 205b is a physical area or zone controlled by the vehicle 100, 101 computer 110. Typically, the area of control 205 a, 205b is defined by the outer boundaries of the vehicle 100, 101 body. For example, as seen in FIG. 2, each vehicle 100, 101 has a respective area of control 205a that does not substantially go beyond the vehicle boundaries. In other words, the vehicle 100, 101 area of control 205a is a physical area occupied by the vehicle 100, 101 at a current time. An area of control 205a can change over time as a vehicle 100, 101 moves, i.e., changes location. Further, a vehicle 100, 101 typically has sensing area 210, i.e., a physical area around the vehicle 100, 101 concerning which various sensors 125 provide data. FIG. 2 illustrates a default sensing area 210 for each of the vehicles 100, 101. Typically, a sensing area 210 is defined so as to be large enough to allow for sensors 125 to provide a computer 110 with sufficient data to operate, e.g., navigate, a vehicle 100, 101, which results in a smaller sensing area 210 than permitted by a maximum range of various sensors 125.

FIG. 3A illustrates a scenario in which the client vehicle 101 has experienced an event that includes a failure of one or more sensors 125. FIG. 3A does not illustrate an area of control 205a for the client vehicle 101 because the second vehicle 101 computer 110 may be unable to provide control instructions due to the event. However, it is to be understood that a client vehicle 101 event could cause the host vehicle 100 to expand its area of control 205b, even where certain vehicle 101 sensors 125 were operating to provide data within a diminished sensing area 210 or the same area 210 as the default area 210, but with fewer sensors 125 providing data to the client vehicle 101 computer 110.

In one example, the second vehicle 101 computer 110 may detect multiple vehicles 100 in the second vehicle 101 sensing area 210. The second vehicle 101 computer 110 may be programmed to select one of the vehicles 100 as the first vehicle 100, and to transmit the request for assistance to the selected first vehicle 100. Selecting the first vehicle 100 may be based on a location, direction of movement, and/or distance of the first vehicle 100 relative to the second vehicle 101. For example, a vehicle 100 travelling in an opposite direction relative to the second vehicle 101 may be unsuitable for providing instructions to the second vehicle 101. As another example, a vehicle 100 travelling with a relative speed greater than a predetermined speed difference threshold may not be suitable for providing control instructions to the second vehicle 101. Yet as another example, a vehicle 100 travelling on a different lane compared to the second vehicle 101 lane and/or having a relative distance greater than a maximum relative distance threshold may not be suitable for providing control instructions to the second vehicle 101. In one example, the second vehicle 101 computer 110 may be programmed to select as a first vehicle 100 a vehicle 100 that is closest ahead of the second vehicle 101 and traveling in a same direction.

FIG. 3B illustrates a scenario in which a second vehicle 101 computer has identified an event. However, the second vehicle 101 computer 110 is unable to find a first vehicle 100 computer 110 to confirm an ability to provide control instructions to the second vehicle 101. Thus, FIG. 3B does not illustrate a first vehicle 100 area of control 205b including the second vehicle 101, nor is a second vehicle 101 area of control 205a shown, because the second vehicle 101 computer 110 may be partially or fully unable to control the second vehicle 101 due to the identified event. In one example, the second vehicle 101 computer 110 may find no first vehicle 100 in the second vehicle 101 sensing area 210. In another example, a first vehicle 100 computer 110 receives a message from the second vehicle 101 computer 110 indicating an event, however the first vehicle 100 computer 110 declines to expand its area of control 205a to include the second vehicle 101.

A first vehicle 100 declining a request from a second vehicle 101 for assistance, i.e., control, may occur for various reasons. For example, the first vehicle 100 computer 110 may determine that a distance between the vehicles 100, 101 is greater than a predetermined maximum acceptable distance. As another example, the first vehicle 100 computer 110 may determine that another vehicle (not shown) is placed between the first vehicle 100 and the second vehicle 101. Yet as another example, the first vehicle 100 computer 110 may determine that there is an incompatibility between the vehicles 100, 101 computers 110. For example, the first vehicle 100 computer 110 may be unable to have access to information about range and unit of control instructions suitable for a second vehicle 101 subsystem, e.g., a range or unit of brake pressure signal used in the second vehicle 101 may not be known to the first vehicle 100 computer 110.

As discussed above, a host vehicle 100 area of control 205a can be redefined by the vehicle 100 computer 110 upon receiving a message from a client vehicle 101 computer 110 indicating an event in the client vehicle 101. The computer 110 can define an area of control 205a, 205b according to various data, including a possible vehicle 100 maximum sensing area 210, dimensions of the first vehicle 100, dimensions of the second vehicle(s) 101, and location of the second vehicle(s) 101 relative to the first vehicle 100.

The maximum sensing area of a vehicle can be determined according to a maximum range of various sensors 125 in current environmental conditions (e.g., as is known, sensor 125 data can be affected by conditions such as ambient light, precipitation, fog, etc.). For example, a vehicle 100 sensing area 210 may be determined according to a range of a radiation field of a vehicle-to-vehicle communication interface 115, as well as a range of sensors 125 such as RADAR, LIDAR, still and/or video cameras etc.

The vehicle 100 computer 110 can further define an area of control 205b including the vehicles 100, 101, e.g., a rectangle extending from the vehicle 100 front bumper to the vehicle 101 rear bumper, as shown in FIG. 3. Alternatively, the area of control 205b may have other shapes, e.g., oval.

As mentioned above, a first vehicle 100 computer 110 may be programmed to receive a message from the second vehicle 101 indicating an event. Receipt of such a message may trigger the first vehicle 100 computer 110 to define an expanded area of control 205b, the area of control 205b including the second vehicle 101. An event as mentioned above is defined as a failure in a second vehicle 101 component such as a malfunction in a sensor 125 (e.g., a camera, LIDAR, RADAR, etc.). The vehicle 100 computer 110 may be programmed to determine the first vehicle 100 area of control 205b to include the second vehicle 101 location and then to provide control instructions to the second vehicle 101.

The first vehicle 100 computer 110 may be programmed to receive data from a sensor 125 such as a first vehicle 100 camera sensor 125, and to provide the control instructions to the second vehicle 101 based at least in part on such sensor 125 data. For example, the sensor 125 data may indicate an obstacle to the first vehicle 100 computer 110 while the second vehicle 101 is following the first vehicle 100. The first vehicle 100 computer 110 may send control instructions such as to change a steering angle, to accelerate, to apply a brake actuation pressure (e.g., 100 pounds per square inch, or psi), etc., via the first vehicle 100 wireless communication interface 115 to the second vehicle 101. The second vehicle 101 computer 110 may receive the control instruction via the second vehicle 101 wireless communication interface 115. The second vehicle 101 computer 110 may further provide the control instruction to a vehicle 101 brake controller, e.g., to apply a 100 psi brake pressure via the second vehicle 101 brake actuators 120, a request to the second vehicle 101 steering actuator 120 to change a steering angle of the vehicle 101, e.g., ten degrees, in order to change a lane, etc.

The first vehicle 100 computer 110 may further receive data from second vehicle 101 sensors 125, e.g., a GPS coordinate of the second vehicle. The first vehicle 100 computer 110 can use such data to formulate control instructions to the second vehicle 101.

As stated above, the area of control 205a, 205b may include the first vehicle 100 and one or more second vehicles 101. In one example, when the second vehicle 101 is following the first vehicle 100, the first vehicle 100 computer 110 may provide cruise control instructions to the second vehicle 101, e.g., accelerating/decelerating the second vehicle 101 to maintain a safe distance between the vehicles 100, 101. In such example, the first vehicle 100 computer 110 may provide control instructions to the second vehicle 101 based at least on a distance of the second vehicle 101 relative to the first vehicle 100. For example, the first vehicle 100 computer 110 may provide an instruction to decelerate the second vehicle 101, e.g., via a request to the second vehicle 101 brake actuators 120, when the second vehicle 101 distance to the first vehicle 100 is less than a predetermined distance threshold.

Operation in Expanded Area of Control

The host vehicle 100 computer 110 may receive data indicating distance(s) of one or more second vehicle(s) 101 relative to the first vehicle 100, from the first vehicle 100 sensors 125, e.g., from a rear ultrasound sensor, and/or from the second vehicle 101 sensors 125 such as a front radar sensor 125. Alternatively or additionally, the computer 110 may determine the distance to a second vehicle 101 based on respective GPS coordinates of the vehicles 100, 101. For example, a second vehicle 101 could provide a vehicle-to-vehicle message with its coordinates at a specified time. Yet further additionally or alternatively, the first vehicle 100 computer 110 may provide control instructions to second vehicle(s) 101 based on a relative distance between the second vehicles 101 and the first vehicle 100. For example, when the area of control 205b includes multiple second vehicles 101 in a lane, the first vehicle 100 computer 110 may take into account distances between second vehicles 101 and/or distances of the second vehicles 101 relative to the first vehicle 100. In another example, when the area of control 205b includes multiple second vehicles 101 in multiple lanes, the first vehicle 100 computer 110 may take into account the lateral and longitudinal distances of the second vehicles 101 relative to the first vehicle 100, e.g., two dimensional coordinates of the second vehicles 101 relative to the coordinates of the first vehicle 100.

In one example, first vehicle 100 computer 110 and/or second vehicle 101 may broadcast messages via wireless communication interface 115 indicating that the second vehicle 101 is at least partially controlled by the first vehicle 100. The broadcast messages may be received by other vehicles 102 proximate to the vehicles 100, 101. Other vehicles 102 may then avoid placing themselves between the vehicles 100, 101.

The first vehicle 100 computer 110 may be further programmed to provide the control instructions to navigate the second vehicle 101 to an identified stopping or parking location, e.g., in order to prevent a stoppage of traffic or reduce a risk of accident, upon receiving an indication of an event in the second vehicle 101. The first vehicle 100 computer 110 can identify the stopping location, e.g., according to a map stored in a memory. During parking, the first vehicle 100 computer 110 may navigate the first vehicle 100 to a location from which the first vehicle 100 sensors 125 can provide data by which the first vehicle 100 computer 110 can guide the second vehicle 101 to the identified second vehicle 101 stopping location.

The second vehicle 101 computer 110 is programmed to detect an event in the second vehicle 101, and to broadcast a message indicating the event, which message can be received in the first vehicle 100. The second vehicle 101 computer 110 may apply a control signal to actuate second vehicle 101 operations at least in part based on instructions from the first vehicle 100, e.g., to use first vehicle 100 sensor 125 data to operate the second vehicle 101.

Exemplary Process Flow

Figure 4:
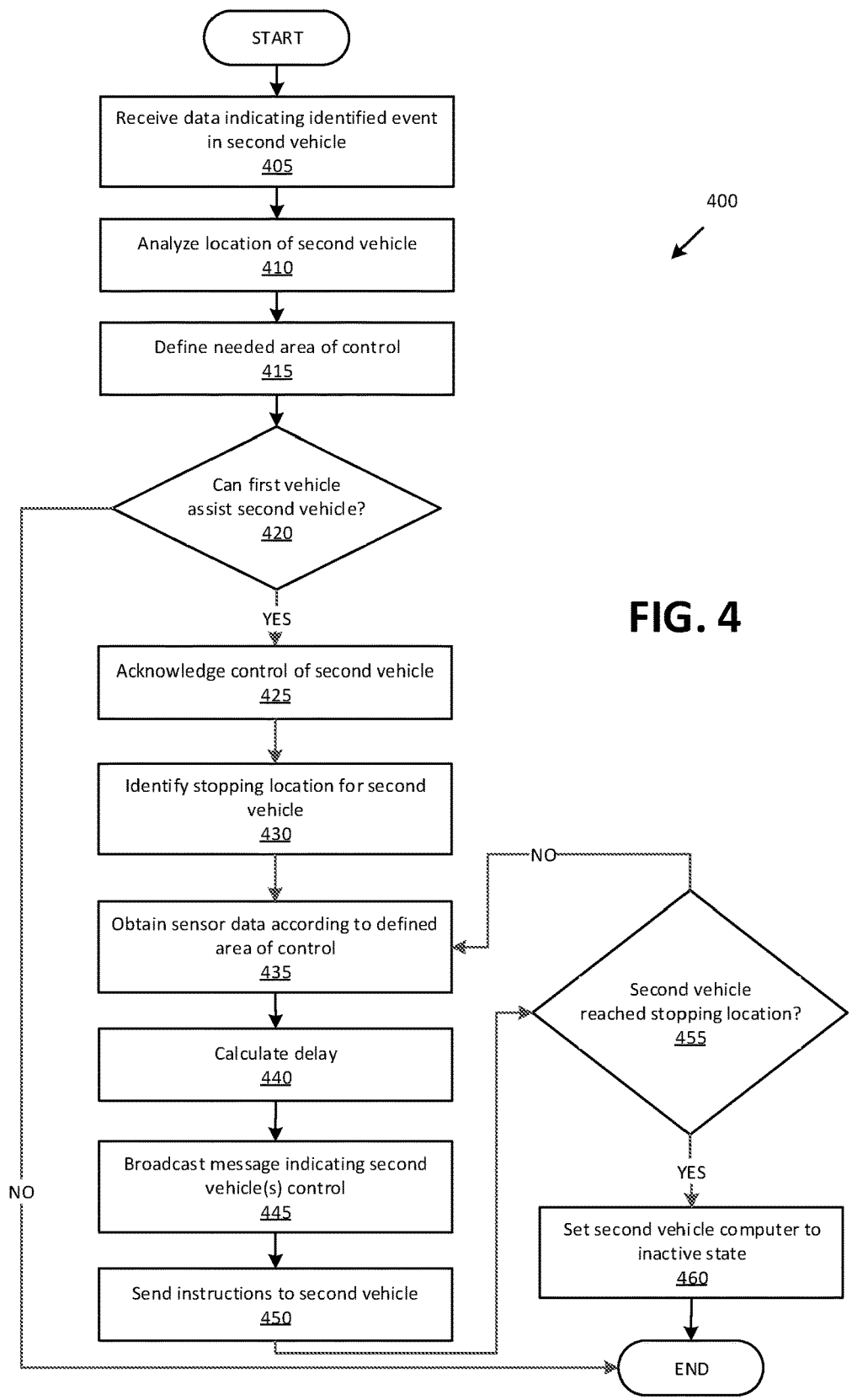
FIG. 4 is a flowchart of an exemplary process for a host vehicle controlling a client vehicle.

FIG. 4 illustrates an example process 400 for a first (or host) vehicle 100 computer 110 providing control instructions to a second (or client) vehicle 101 computer 110. The first vehicle 100 computer 110 may be programmed in accordance with the example process 400.

The process 400 begins in a block 405, in which the first vehicle 100 computer 110 receives, via a vehicle-to vehicle communication, data indicating an identified event in a second vehicle 101, e.g., a second vehicle 101 camera sensor 125 failure. Additionally, the received data may include other information such as GPS location of the second vehicle 101, a second vehicle 101 unique identifier, e.g., a license plate number, etc.

Next, in a block 410, the first vehicle 100 computer 110 analyzes the second vehicle 101 location relative to the first vehicle 100 location based on, e.g., received data at the block 405, first vehicle 100 sensors 125, etc. For example, the first vehicle 100 camera sensors 125 may detect the second vehicle 101 and the location thereof using image processing techniques, as are known. Alternatively or additionally, radar, LIDAR, etc. could be used.

Next, in a block 415, the first vehicle 100 computer 110 defines a needed area of control 205a, 205b to provide control instructions to the second vehicle 101, i.e., an area including at least the vehicles 100, 101. For example, the defined area of control 205a, 205b may be a rectangular, hourglass, or oval shaped area including the vehicles 100, 101. The defined area of control 205a, 205b moves as the vehicles 100, 101 move, and may change in size and shape based at least on changes of vehicles 100, 101 locations and/or speed with respect to one another. As another example, defined area of control 205a, 205b may change in shape and/or size depending on road conditions, e.g., road curvature.

Next, in a decision block 420, the first vehicle 100 computer 110 determines whether the first vehicle 100 computer can assist, i.e., can provide control instructions to, the second vehicle 101 computer 110. Such determination may be based at least on the defined area of control 205a, 205b and/or location of the second vehicle 101 relative to the first vehicle 100. For example, the first vehicle 100 computer 110 may decline helping the second vehicle 101, when the distance between the vehicles 100, 101 is greater than a predetermined threshold. Additionally or alternatively, the first vehicle 100 computer 110 may decline to provide control instructions to the second vehicle 101 for various other reasons, e.g., when another vehicle 102 is placed between the vehicle 100, 101. If the first vehicle 100 computer 110 can help the second vehicle 101, a block 425 is executed next; otherwise, the process 400 ends.

In the block 425, the first vehicle 100 computer 110 may modify, i.e., expand, the first vehicle 100 area of control 205a to include the defined area of control 205b, i.e., expand the area of control 205a to include the second vehicle 101. Further, the first vehicle 100 computer 110 can acknowledge control of the second vehicle 101, e.g., by sending a message to the second vehicle 101 computer 110 via the vehicle-to-vehicle communication network.

Next, in a block 430, the first vehicle 100 computer 110 may identify a stopping location for the second vehicle 101, e.g., based on the second vehicle 101 location. For example, the first vehicle 100 computer 110 may receive map data including available stopping location proximate to the vehicles 100, 101 locations.

Next, in a block 435, the first vehicle 100 computer 110 receives sensor data in accordance with the defined area of control 205b from, e.g., the first vehicle 100 sensors 125. In addition, the first vehicle 100 computer 110 may receive data from the second vehicle 101 sensors 125, which are not affected by the identified failure event.

Next, in a block 440, the first vehicle 100 computer 110 calculates a delay (or time lag) between the vehicles 100, 101. For example, when the vehicles 100, 101 move with a constant speed 50 km/h, and the second vehicle 101 follows the first vehicle with a distance of 15 meters, then a time delay of the second vehicle 101 relative to the first vehicle 100 is 1.08 sec. As discussed below, control instructions for the second vehicle 101 computer 110 may be partially based on the time delay of the second vehicle 101 relative to the first vehicle 100.

Next, in a block 445, the first vehicle 100 computer 110 broadcasts a message indicating that the second vehicle 101 is receiving control instructions from the first vehicle 100. This information may be useful to prevent other vehicles 102 from placing themselves between the vehicles 100, 101.

Additionally, the broadcast message may include data indicating the defined area of control 205b.

Next, in a block 450, the first vehicle 100 computer 110 sends control instructions to the second vehicle 101, e.g., via the vehicle-to-vehicle communication network. Such control instructions may be based at least on the received sensor data, the defined area of control 205b, and the time delay between the vehicles 100, 101. For example, the first vehicle 100 computer 110 can receive sensor data from the first vehicle 100 radar sensor 125 indicating an obstacle on first vehicle 100 driving path that may be avoided by, e.g., sending control instructions to the first vehicle 100 steering actuator 120 to steer away from the obstacle. To steer away from an obstacle, the first vehicle 100 computer 110 may calculate a control instruction to change the first vehicle 100 steering angle. The first vehicle 100 computer 110 may apply the change of the steering angle to the first vehicle 100 actuator 120 at a first time based at least in part on a distance from the obstacle to the first vehicle 100. Further, the first vehicle 100 computer 110 may send control instructions to the second vehicle 101 at a second time that is some amount of time after the first time, the instructions being sent based on a calculated time delay of the second vehicle 101 relative to the first vehicle 100.

Next, in a decision block 455, the first vehicle 100 computer 110 determines whether the second vehicle 101 reached the stopping location. For example, the first vehicle 100 computer 110 may determine the second vehicle 101 location based on the first vehicle 100 sensor 125 data (e.g., GPS, a camera, LIDAR, RADAR, etc.) and/or the second vehicle 101 sensor 125 data (e.g., GPS). If the first vehicle 100 computer 110 determines that the second vehicle 101 reached the stopping location, a block 460 is executed next; otherwise the block 435 is executed next.

In the block 460, the first vehicle 100 computer 110 sets the second vehicle 101 computer 110 to an inactive state, e.g., by sending an instruction to deactivate the second vehicle 101 powertrain operation. Deactivating the second vehicle 101 computer 110 may prevent a further move of the second vehicle 101 after the first vehicle 100 moves away and is no longer in range to provide control instructions to the second vehicle.

Following the block 460, the process 400 ends.

FIG. 5 illustrates an example process 500 for a second (or client) vehicle 101 computer 110 receiving assistance from a first (or host) vehicle 100. The second vehicle 101 computer 110 may be programmed according to the process 500.

The process 500 begins in a block 505, in which the second vehicle 101 computer 110 identifies an event, e.g., a second vehicle 101 sensor 125 failure. For example, the second vehicle 101 computer 110 may be programmed to detect a failure event in a second vehicle 101 sensor 125 and/or other electronic components.

Next, in a block 510, the second vehicle 101 computer 110 verifies whether the second vehicle 101 communication network including wireless communication is operational. At least the second vehicle 101 wireless communication interface 115 should be operational in order to receive the reply from the first vehicle 100 and apply an instruction included in the reply.

Next, in a block 515, the second vehicle 101 computer 110 verifies whether actuators 120, e.g., a steering actuator 120, are operational. In order to receive assistance from a first vehicle 100, the second vehicle 101 computer 110 needs to be able to execute received control instructions including use of actuators 120.

Next, in a block 525, the second vehicle 101 computer detects a first vehicle 100 in the second vehicle 101 sensing area 210 based on, e.g., the second vehicle 101 sensor 125 data such as camera, LIDAR, radar, etc. Additionally or alternatively, the second vehicle 101 may detect a first vehicle 100 via vehicle-to-vehicle communication, e.g., based on location data of a first vehicle 100 received via the second vehicle 101 wireless communication interface 115.

Next, in a block 530, the second vehicle 101 computer 110 sends a request for assistance to the first vehicle 100 computer 110 detected in the second vehicle 101 sensing area 210. Additionally, prior to sending a request for assistance, the second vehicle 101 computer 110 could determine whether the detected first vehicle 100 is suitable for providing assistance. For example, a first vehicle 100 travelling in an opposite direction relative to the second vehicle 101 may be unsuitable for providing control instructions to the second vehicle 101. Additionally, the second vehicle 101 computer 110 may be programmed to select one of multiple vehicles 100 detected in the second vehicle 101 sensing area 210, and to transmit the request for assistance to the selected first vehicle 100. Selection of the first vehicle 100 may be based on distance, location, and/or direction of movement of the selected first vehicle 100 relative to the second vehicle 101, as discussed above.

Next, in a decision block 535, the second vehicle 101 computer 110 verifies whether the first vehicle 100 computer 110 acknowledges control of the second vehicle 101, e.g., by providing control instructions to the second vehicle 101 computer 110. For example, the second vehicle 101 computer 110 may receive a message via the second vehicle 101 wireless communication interface 115 indicating an acknowledgement. If the second vehicle 101 computer 110 receives an acknowledgement from the first vehicle 100, a block 540 is executed next; otherwise the process 500 ends.

In the block 540, the second vehicle 101 computer 110 broadcasts a message indicating that the second vehicle 101 is receiving control instructions from the first vehicle 100. This information may be useful to prevent other vehicles 102 from interfering with communications and/or control between the vehicles 100, 101, e.g., from placing themselves between the vehicles 100, 101.

Next, in a block 545, the second vehicle 101 computer 110 receives instructions from the first vehicle 100.

Next, in a block 550, the second vehicle 101 computer 110 actuates second vehicle 101 operations, e.g., by applying control signals to the second vehicle 101 actuators 120, at least in part based on the control instructions received from the first vehicle 100. For example, the second vehicle 101 computer 110 may receive a steering angle value such as 10 degrees from the first vehicle 100 and apply the received steering angle value to the second vehicle 101 steering actuator 120. In another example, the second vehicle 101 computer 110 may combine the control instruction received from the first vehicle 100 computer 110 with other control instructions calculated by a second vehicle 101 controller.

Following the block 550, the process 500 ends.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A first vehicle computer, comprising a processor and a memory, the memory storing instructions executable by the processor such that the computer is programmed to:
   receive a message from a second vehicle indicating a fault in a second vehicle component;
   upon receipt of the message, expand an area of control beyond first vehicle boundaries to include a second vehicle location; and
   provide a control instruction to actuate a second vehicle actuator.

2. The computer of claim 1, further programmed to receive data from a sensor of the first vehicle, and to provide the control instruction to the second vehicle at least partially based on the received data from the sensor of the first vehicle.

3. The computer of claim 2, further programmed to provide the control instruction at least partially based on a distance between the first vehicle and the second vehicle.

4. The computer of claim 1, wherein the control instruction is based in part on the expanded area of control.

5. The computer of claim 1, further programmed to identify a stopping location for the second vehicle and to provide a plurality of control instructions to navigate the second vehicle to the identified stopping location.

6. The computer of claim 5, further programmed to set a second vehicle computer to an inactive state upon determining that the second vehicle reached the identified stopping location.

7. The computer of claim 1, further programmed to receive, from the second vehicle, data specifying a location of the second vehicle.

8. The computer of claim 1, further programmed to broadcast a message indicating that the second vehicle is at least partially controlled by the first vehicle.

9. The computer of claim 1, wherein the expanded area of control is defined by an area at least including the first vehicle and the second vehicle.

10. A computer for a first vehicle, comprising a processor and a memory, the memory storing instructions executable by the processor such that the computer is programmed to:
    detect a fault in a first vehicle subsystem;
    detect a second vehicle in a first vehicle sensing area;
    transmit a message indicating the fault to the second vehicle; and
    apply a control signal specified in a reply from the second vehicle to actuate a first vehicle actuator.

11. The computer for a first vehicle of claim 10, further programmed to verify whether a vehicle-to-vehicle communication interface of the first vehicle is operational.

12. The computer for a first vehicle of claim 10, further programmed to verify whether an actuator of the first vehicle is operational.

13. The computer for a first vehicle of claim 10, wherein the computer is further programmed to detect the second vehicle by at least:
    detecting a plurality of other vehicles in the first vehicle sensing area; and
    selecting the second vehicle based on the detected plurality of other vehicles.

14. The computer for a first vehicle of claim 13, wherein the computer is further programmed to receive data associated with the plurality of other vehicles from at least one of (i) sensors of the first vehicle and (ii) the detected plurality of other vehicles.

15. The computer for a first vehicle of claim 14, wherein the received data include at least one of distance, location, and speed of the plurality of other vehicles relative to the first vehicle, and the computer is further programmed to select the second vehicle based at least in part on one of the distance, location, and speed of the plurality of other vehicles.

16. The computer for a first vehicle of claim 10, wherein applying the control instruction includes instructions to actuate at least one of a brake, a powertrain, and steering.

17. The computer for a first vehicle of claim 10, further programmed to broadcast a message indicating that the first vehicle is controlled by the second vehicle.

18. A method, comprising:
   detecting a fault in a first vehicle subsystem;
   detecting a second vehicle in a first vehicle sensing area of the first vehicle;
   transmitting a message indicating the detected fault to the second vehicle; and
   receiving, in the second vehicle, the message from the first vehicle indicating the fault;
   expanding an area of control beyond second vehicle boundaries to include a first vehicle location;
   providing, by the second vehicle, one or more control instructions to actuate a first vehicle actuator; and
   applying a control signal specified in a reply from the second vehicle to actuate the first vehicle actuator.

19. The method of claim 18, further comprising broadcasting a message, by at least one of the first vehicle and the second vehicle, indicating that the first vehicle is at least partially controlled by the second vehicle.

20. The method of claim 18, further comprising verifying whether a vehicle-to-vehicle communication interface of the first vehicle is operational.

\* \* \* \* \*